(12) United States Patent
Umnov et al.

(10) Patent No.: US 8,340,515 B2
(45) Date of Patent: Dec. 25, 2012

(54) METHOD AND SYSTEM FOR MONITORING OPTICAL DISPERSION IN AN OPTICAL SIGNAL

(75) Inventors: Alexander Umnov, Sachse, TX (US); Takao Naito, Plano, TX (US); Niranjan Hanumanna, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 135 days.

(21) Appl. No.: 12/611,670

(22) Filed: Nov. 3, 2009

(65) Prior Publication Data

US 2011/0103791 A1    May 5, 2011

(51) Int. Cl.
*H04B 10/12* (2006.01)
*H04B 10/08* (2006.01)
*H04J 14/02* (2006.01)
*G02B 6/26* (2006.01)

(52) U.S. Cl. ............ 398/1; 398/29; 398/140; 398/147; 398/208; 359/334; 359/337; 385/37; 385/39

(58) Field of Classification Search .......... 398/147, 398/140
See application file for complete search history.

(56) References Cited

U.S. PATENT DOCUMENTS

| | | | | |
|---|---|---|---|---|
| 6,639,701 | B1* | 10/2003 | Hirst | 398/5 |
| 6,765,659 | B1* | 7/2004 | Bhatnagar et al. | 356/73.1 |
| 7,386,231 | B2* | 6/2008 | King et al. | 398/27 |
| 7,447,432 | B2* | 11/2008 | Fielding et al. | 398/38 |
| 2004/0184813 | A1* | 9/2004 | Mikami | 398/147 |
| 2005/0226628 | A1* | 10/2005 | Watanabe | 398/147 |
| 2006/0176984 | A1* | 8/2006 | Lee et al. | 375/343 |
| 2006/0263005 | A1* | 11/2006 | Papakos et al. | 385/27 |
| 2008/0080867 | A1* | 4/2008 | Itoh et al. | 398/97 |
| 2009/0142070 | A1* | 6/2009 | Boduch et al. | 398/148 |
| 2009/0190925 | A1* | 7/2009 | Iizuka et al. | 398/33 |

\* cited by examiner

*Primary Examiner* — Shi K Li
*Assistant Examiner* — Oommen Jacob
(74) *Attorney, Agent, or Firm* — Baker Botts L.L.P.

(57) ABSTRACT

A method is provided for dispersion compensation of an optical signal communicated in an optical network. The method may include receiving an optical signal comprising a plurality of channels. The method may further include filtering at least one channel from the plurality of channels. The method may also include analyzing the at least one channel of the plurality of channels to measure optical dispersion in the at least one channel. The method may additionally include compensating for optical dispersion based on the measured dispersion.

8 Claims, 2 Drawing Sheets

METHOD AND SYSTEM FOR MONITORING OPTICAL DISPERSION IN AN OPTICAL SIGNAL

TECHNICAL FIELD OF THE INVENTION

The present invention relates generally to optical networks and, more particularly, to a method and system for monitoring optical dispersion in an optical signal.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. Optical networks often employ wavelength division multiplexing (WDM) or dense wavelength division multiplexing (DWDM) to increase transmission capacity. In WDM and DWDM networks, a number of optical channels are carried in each fiber at disparate wavelengths, thereby increasing network capacity.

An optical signal comprised of disparate wavelengths experiences optical dispersion, an often undesirable phenomenon that causes the separation of an optical wave into spectral components with different frequencies. Optical dispersion occurs because the differing wavelengths propagate at differing speeds. The separation of an optical wave into its respective channels due to optical dispersion may require optical dispersion compensation for the particular optical signal.

SUMMARY

In accordance with a particular embodiment of the present invention, a method is provided for dispersion monitoring of an optical signal communicated in an optical network comprising one or more spans of optical fiber. The method may include receiving an optical signal comprising a plurality of channels. The method may further include filtering at least one channel from the plurality of channels. The method may also include analyzing the at least one channel of the plurality of channels to measure optical dispersion in the at least one channel. The method may additionally include compensating for optical dispersion based on the measured dispersion.

Technical advantages of one or more embodiments of the present invention may provide methods and systems for in-service, per-channel dispersion monitoring in an optical system. The provision of in-service monitoring may reduce downtime or service interruptions associated with traditional approaches to dispersion monitoring.

Embodiments of the present invention may also allow for an economically efficient system and method for performing optical dispersion monitoring of optical signals comprised of channels with different modulation formats. One or more of the embodiments of the present invention may include system components currently in use in optical networks or allow for economically efficient upgrades of or additions to currently used components.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
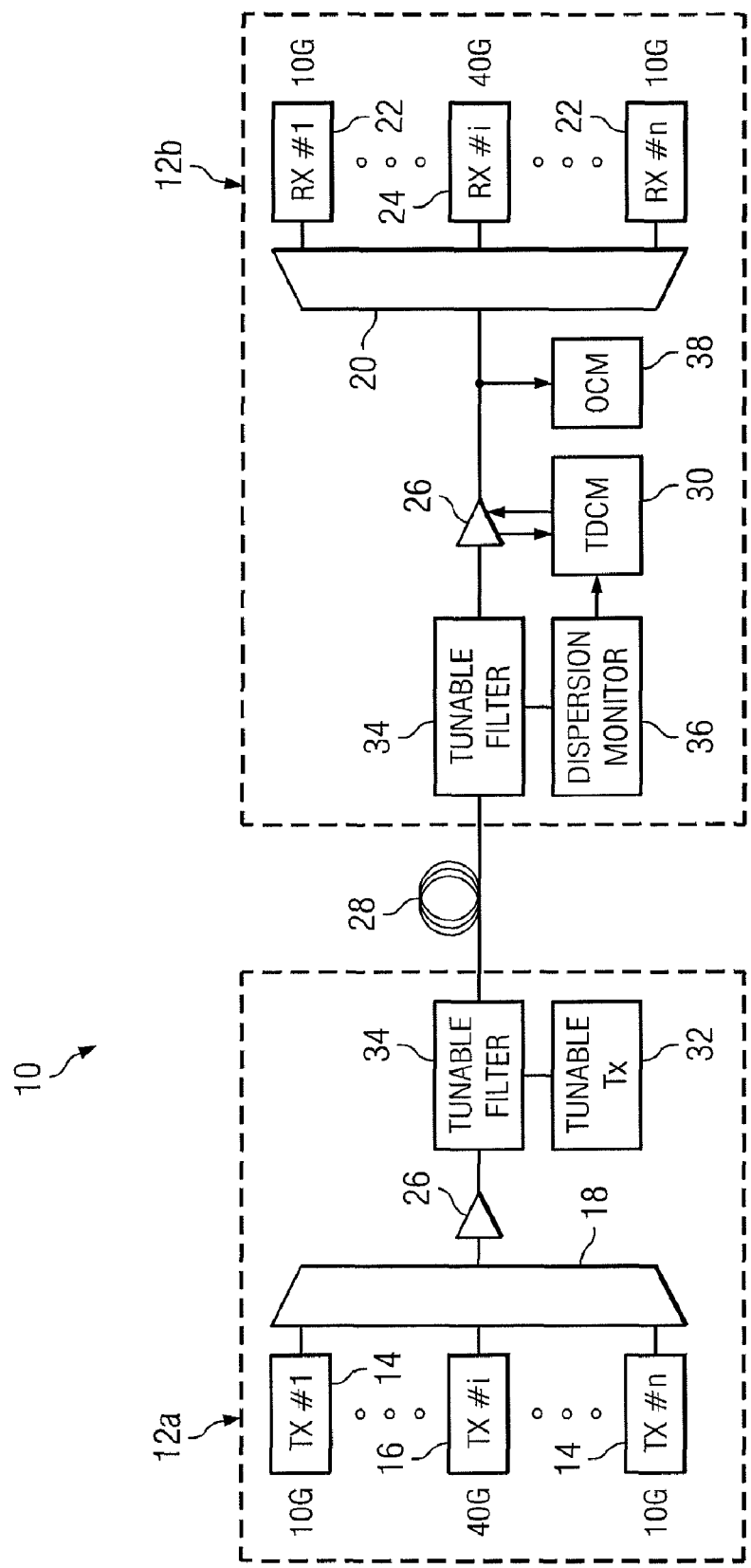
FIG. 1 is a block diagram illustrating one embodiment of an optical network including components for monitoring and compensation for optical dispersion.

FIG. 1 illustrates an example optical network 10. Optical network 10 may include one or more optical fibers 28 operable to transport one or more optical signals communicated by components of the optical network 10. The components of optical network 10, coupled together by optical fiber 28, include nodes 12a and 12b. Although the optical network 10 is shown as a point-to-point optical network with terminal nodes, the optical network 10 may also be configured as a ring optical network, a mesh optical network, or any other suitable optical network or combination of optical networks, and may include any number of nodes intermediate to nodes 12a and 12b. The optical network 10 may be used in a short-haul metropolitan network, a long-haul inter-city network, or any other suitable network or combination of networks.

Node 12a may include transmitters 14 and 16, a multiplexer 18, an amplifier 26, a tunable transmitter 32, and a tunable filter 34. Transmitters 14 and 16 may include any transmitter or other suitable device operable to transmit optical signals. Each transmitter 14 or 16 may be configured to receive information and transmit a modulated optical signal at a certain wavelength. In optical networking, a wavelength of light is also referred to as a channel. Each transmitter 14 or 16 may also be configured to transmit this optically encoded information on the associated wavelength. The multiplexer 18 may include any multiplexer or combination of multiplexers or other devices operable to combine different channels into one signal. Multiplexer 18 may be configured to receive and combine the disparate channels transmitted by transmitters 14 and 16 into an optical signal for communication along fibers 28.

Amplifier 26 may be used to amplify the multi-channeled signal. Amplifier 26 may be positioned before and/or after certain lengths of fiber 28. Amplifier 26 may comprise an optical repeater that amplifies the optical signal. This amplification may be performed without opto-electrical or electro-optical conversion. In particular embodiments, amplifier 26 may comprise an optical fiber doped with a rare-earth element. When a signal passes through the fiber, external energy may be applied to excite the atoms of the doped portion of the optical fiber, which increases the intensity of the optical signal. As an example, amplifier 26 may comprise an erbium-doped fiber amplifier (EDFA). However, any other suitable amplifier 26 may be used.

Tunable transmitter 32 may include any transmitter or other suitable device configured to transmit optical signals at one or more selected wavelengths. In some embodiments, tunable transmitter 32 may transmit one or more test signals at one or more selected wavelengths that may be combined with the multi-channel signal amplified by amplifier 26 of node 12a. In the same or alternative embodiments, the optical signals transmitted by tunable transmitter 32 may be varied among one or more selected wavelengths.

Tunable filter 34 may include any filter or other suitable device configured to receive optical signals from tunable transmitter 32 and amplifier 26 of node 12a, remove or filter out one or more channels of the multi-channel signal from amplifier 26, and combine the remaining multi-channel signal with the optical signal from tunable filter 32. In some embodiments, the channels filtered from the multi-channel signal from amplifier 26 may be of the same wavelength as the one or more channels communicated from tunable transmitter 32. In the same or alternative embodiments, tunable filter 34 may be a Fabry-Perot filter.

The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength. With more bandwidth, optical networks are capable of transmitting greater amounts of information. Referring back to FIG. 1, node 12a in optical network 10 may be configured to transmit and multiplex disparate channels using WDM, DWDM, or some other suitable multi-channel multiplexing technique, and to amplify the multi-channel signal.

As discussed above, the amount of information that can be transmitted over an optical network varies directly with the number of optical channels coded with information and multiplexed into one signal. Therefore, an optical signal employing WDM may carry more information than an optical signal carrying information over solely one channel. An optical signal employing DWDM may carry even more information. Besides the number of channels carried, another factor that affects how much information can be transmitted over an optical network is the bit rate of transmission. The greater the bit rate, the more information may be transmitted.

Improvements and upgrades in optical network capacity generally involve either increasing the number of wavelengths multiplexed into one optical signal or increasing bit rates of information traveling on each wavelength. In either case, it is usually more cost-efficient to use, modify, or add to existing network components than to replace the entire optical system. For reasons relating to the cost of upgrading an optical system, upgrades sometimes occur in stages in which the network must support both new technologies that provide greater bandwidth and old technologies that provide less bandwidth.

Today, many existing networks transmit information at ten gigabits per second (Gb/s) and modulate the optical signal using, for example, a non-return-to-zero (NRZ) modulation technique. Signal transmission upgrades include, for example, transmitting information at forty Gb/s using differential phase shift keying (DPSK) or differential quadrature phase shift keying (DQPSK) to modulate the optical signal. Since upgrading the entire optical network's transmitters would be cost-prohibitive for most optical network operators, many such operators have instead desired to upgrade their networks by incrementally replacing existing ten Gb/s NRZ transmitters with forty Gb/s DPSK or DQPSK transmitters (these types of transmitters being used only as examples).

Another challenge faced in upgrading optical networks to support higher bit rates is that of signal spectrum broadening. Signal spectrum broadening is a phenomenon by which the frequency spectrum of a signal becomes wider as the signal rate increases. For example, in some optical systems, an unmodulated signal may have a narrow signal spectrum of approximately 50 MHz, a ten GB/s signal may have a signal spectrum of several GHz, and a forth GB/s signal may have a signal spectrum of tens of GHz.

One challenge faced by those wishing to implement the cost-efficient strategy of integrating upgraded transmitters with existing transmitters is the challenge of optical dispersion monitoring and compensation. Even in existing WDM and DWDM networks, optical signals comprised of disparate wavelengths experience optical dispersion. Optical dispersion refers to the separation of an optical signal into its spectral components with different frequencies. Optical dispersion occurs because the differing wavelengths propagate at differing velocities. As optical signals travel across existing optical networks and experience optical dispersion, they may receive appropriate optical dispersion compensation to achieve at least adequate performance. Specially designed dispersion compensation fibers have been developed to compensate for dispersion in an optical signal comprised of channels modulated using the same modulation technique.

However, traditional approaches to optical dispersion monitoring and compensation may have many disadvantages. For example, dispersion compensation may be accomplished using fixed compensation approaches (e.g., dispersion compensating fibers) or "set and forget" approaches which may involve once-per-lifetime manual tuning. These approaches are often undesirable as dispersion in an optical network may change due to temperature variations, mechanical vibrations, or other environmental conditions. Traditional dispersion monitors have not proven practicable because they require a dedicated light source and typically do not permit in-service monitoring (e.g., it is often required to take a network offline or out of service for monitoring).

As shown in FIG. 1, the WDM signal generated by node 12a may include sets of channels using different modulation formats. In particular, the WDM signal may comprise a set of channels communicating information at ten Gb/s using NRZ modulation and a set of channels communicating information at forty Gb/s using nPSK modulation; however, the sets of disparate channels may communicate information at any suitable bit rate and/or using any suitable modulation technique. For example, one or more of the channels may communicate information at a rate of ten, twenty, forty, eighty, over eighty Gb/s, or any other suitable bit rate. One or more of the channels may additionally communicate information using a modulation technique such as return-to-zero (RZ), carrier suppressed return-to-zero (CS-RZ), NRZ, DPSK, DQPSK, or any other suitable modulation technique. As used herein, a "set" of channels may include one or more channels and does not imply any spatial or any other unspecified relationship among the channels (for example, the channels in a set need not be contiguous). In addition, as used herein, "information" may include any information communicated, stored, or sorted in the network. This information may have at least one characteristic modulated to encode audio, video, textual, real-time, non-real-time and/or other suitable data. Additionally, information communicated in optical network 10 may be structured in any appropriate manner including, but not limited to, being structured as frames, packets, or an unstructured bit stream.

After the multi-channel signal is transmitted from node 12a, the signal may travel over one or more optical fibers 28 to node 12b. An optical fiber 28 may include, as appropriate, a single, unidirectional fiber; a single, bi-directional fiber; or a plurality of uni- or bi-directional fibers. Although this description focuses, for the sake of simplicity, on an embodiment of the optical network 10 that supports unidirectional traffic, the present invention further contemplates a bi-directional system that includes appropriately modified embodiments of the components described below to support the transmission of information in opposite directions along the optical network 10. Furthermore, as is discussed in more detail below, the fibers 28 may be high chromatic dispersion fibers (as an example only, standard single mode fiber (SSMF) or non-dispersion shifted fiber (NDSF)), low chromatic dispersion fibers (as an example only, non zero-dispersion-shifted fiber (NZ-DSF), such as E-LEAF fiber), or any other suitable fiber types. According to particular embodiments, different types of fiber 28 create the need for different dispersion compensation schemes to be applied to the signals, as discussed in further detail below.

Node 12b may be configured to receive signals transmitted over optical network 10. Node 12b may include an amplifier 26 and an associated tunable dispersion compensation monitor (TDCM) 30, a tunable filter 34, a dispersion monitor 36, an optical channel monitor (OCM) 38, a demultiplexer 20, and receivers 22 and 24. As described above, amplifier 26 may be used to amplify the WDM signal as it travels through the optical network 10.

TDCM 30 may include any tunable dispersion compensator (TDC), variable dispersion compensator (VDC), other dispersion compensating device configured to perform optical dispersion compensation on a signal or set of channels comprising a signal using one or more modulation techniques, or any combination of the foregoing. Although the optical network 10 shows TDCM 30 coupled to a respective amplifier 26, TDCM 30 may also be positioned separately from amplifier 26.

Tunable filter 34 may include any filter or other suitable device configured to receive optical signals via fiber 28, remove or filter out one or more channels of the multi-channel signal received via fiber 28, and split the one or more filtered channels from the remaining multi-channel signal. In some embodiments, the channels filtered and split from the multi-channel signal received may be of the same wavelength as the one or more channels communicated from tunable transmitter 32. In the same or alternative embodiments, tunable filter 34 of node 12b may be a Fabry-Perot filter.

Dispersion monitor 36 may include any chromatic dispersion monitor, polarization mode dispersion monitor, other device configured to measure optical dispersion of optical signals in optical network 10, or any combination of the foregoing. In some embodiments, dispersion monitor 36 may communicate control signals to TDCM 30 in order to control the optical dispersion compensation that TDCM 30 performs on signals.

OCM 38 may include any device configured to measure one or more parameters of optical signals (e.g., channel power, channel wavelength, and optical signal-to-noise ratio (OSNR) for each channel).

Demultiplexer 20 may include any demultiplexer or other device configured to separate the disparate channels multiplexed using WDM, DWDM, or other suitable multi-channel multiplexing technique. Demultiplexer 20 may be configured to receive an optical signal carrying a plurality of multiplexed channels, demultiplex the disparate channels in the optical signal, and pass the disparate channels to different receivers 22 and 24.

Receivers 22 and 24 may include any receiver or other suitable device operable to receive an optical signal. Each receiver 22 or 24 may be configured to receive a channel of an optical signal carrying encoded information and demodulate the information into an electrical signal. In addition, the forty Gb/s nPSK channels (and/or any other suitable channels) may be additionally compensated at node 12b using, for example, tunable dispersion compensators (not shown in FIG. 1) associated with receivers 24.

In operation, transmitters 14 and 16 of node 12a may transmit information at different bit rates and/or using different modulation techniques over different channels. The multiplexer 18 may combine these different channels into an optical signal and communicate the signal over an optical fiber. An amplifier 26 may receive the optical signal, amplify the signal, and pass the signal over an optical fiber to tunable filter 34.

Tunable transmitter 32 of node 12a may transmit a signal at a particular wavelength to tunable filter 34. The signal may be transmitted at a wavelength to be monitored for dispersion within optical network 10. Tunable filter 34 may receive the multi-channel signal from amplifier 26 of node 12a and the tunable transmitter 32, remove or filter out those channels of the multi-channel signal that are of the same wavelength of the signal communicated from tunable transmitter 32, combine the remaining multi-channel signal with the signal from tunable transmitter 32, and transmit the combined optical signal via optical fiber 28. Optical fiber 28 may transport the signal to node 12b.

Tunable filter 34 of node 12b may receive the signal and split the portion of the signal originating from tunable transmitter 32 from the remainder of the signal. Tunable filter 34 of node 12b may transmit the portion of the signal originating from the tunable transmitter 32 to dispersion monitor 36, and transmit the remainder of the multi-channel signal to amplifier 26 of node 12b.

Dispersion monitor 36 may analyze the portion of the signal originating from tunable transmitter 32 to measure the chromatic dispersion, polarization mode dispersion, and/or other dispersion experienced by the portion of the signal. Based on the measured dispersion, dispersion monitor 36 may communicate control signals to TDCM 30. Based on the control signals communicated to TDCM 30 from dispersion monitor 36, TDCM 30 may perform optical dispersion compensation on the signal communicated to amplifier 26 from tunable filter 34.

Amplifier 26 may amplify the signal communicated passed through tunable filter 34. OCM 38 may analyze the signal to determine the power, wavelength, OSNR, or other parameters associated with one or more channels of the signal.

Demultiplexer 20 of node 12b may receive the signal, demultiplex the signal into the signal's constituent channels, and pass the signal's constituent channels. Each channel may be received by an associated receiver 22 or 24 of node 12b and forwarded.

Advantageously, optical system 10 of FIG. 1, may overcome traditional approaches to optical dispersion monitoring and compensation, as it permits in-service, per-channel dispersion monitoring and compensation. For example, to monitor dispersion on a particular channel, a test signal of the particular channel may be communicated from tunable transmitter 32, and at least a portion of the channel of the same wavelength may be filtered from the multi-channel signal communicated from amplifier 26 of node 12a. In some embodiments, such filtering may be performed by filtering a narrow portion of the channel (e.g., the filter bandwidth may be more narrow than the modulated signal spectrum width).

The remaining portion of the multi-channel signal may then be combined with the test signal and communicated to a node 12b comprising dispersion monitoring and compensation devices. The test signal may then be filtered by tunable filter 34 of node 12b, and analyzed for optical dispersion for the particular channel, while all other channels and the portion of the channel under consideration not filtered by tunable filter 34 may pass through to their respective receivers 22 and 24. Accordingly, optical system 10 requires that only a portions of a single channel of a multi-channel signal be directed to an optical monitor for monitoring and compensation while the rest of the multi-channel signal remains in-service. Because only a portion of one channel is redirected to a monitor, the approaches set forth in this disclosure may lead to a largely negligible or de minimis effect on network communication throughput.

In addition, when performing monitoring and compensation, the test signal of tunable transmitter 32 may be swept through numerous wavelengths, and the dispersion for each such channel may be monitored and compensated, allowing for the monitoring and compensation of multiple channels in the optical network, all the while requiring only one channel to be out-of-service at a time, again leading to a largely negligible or de minimis effect on network communication throughput.

Figure 2:
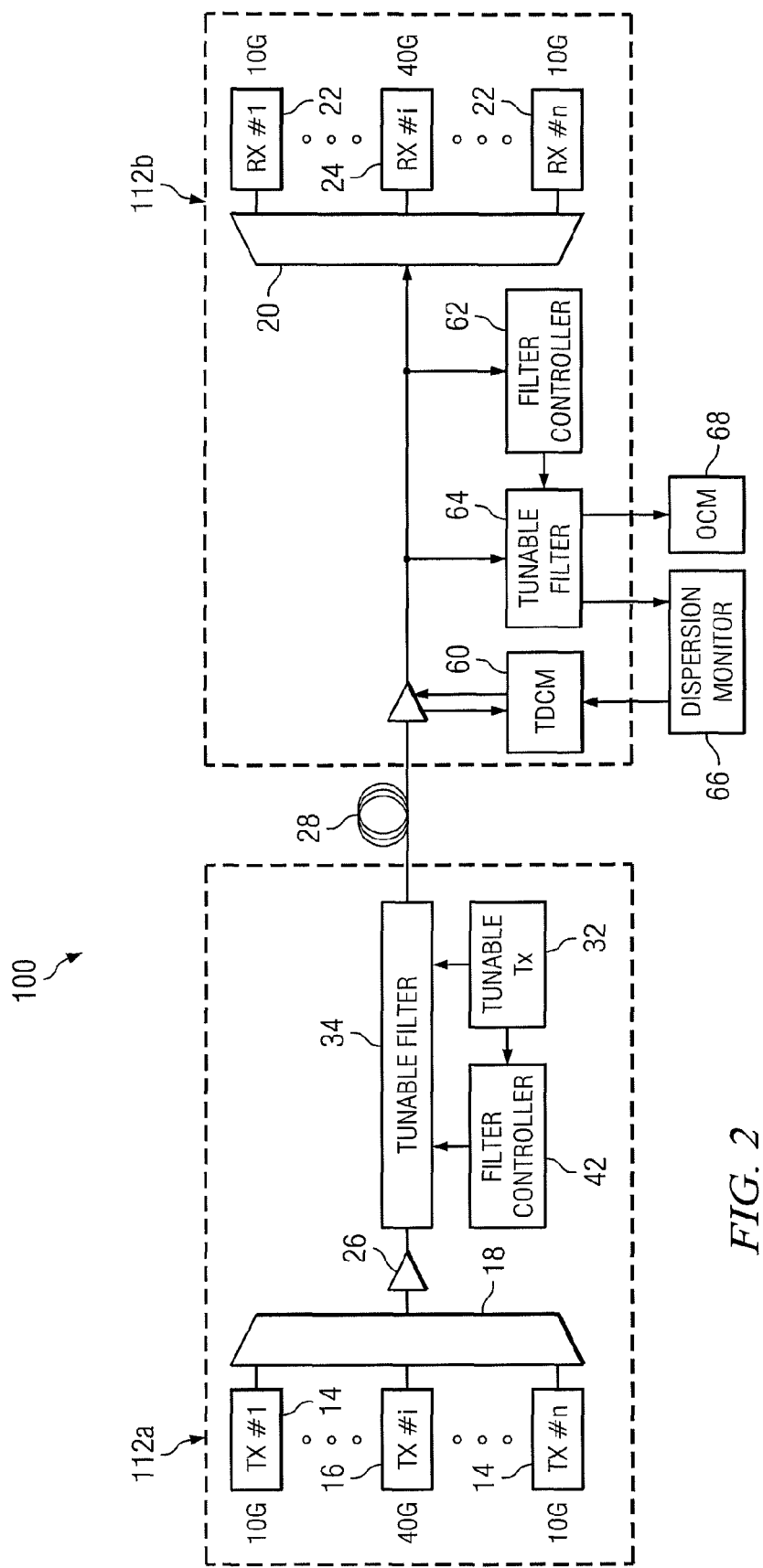
FIG. 2 is a block diagram illustrating another embodiment of an optical network including components for monitoring and compensation for optical dispersion.

FIG. 2 is a block diagram illustrating an embodiment of an optical network 100 including components for monitoring and compensation for optical dispersion. Optical network 100 is similar to that of optical network 10 of FIG. 1, with modifications. Accordingly, similar elements will not be described again with respect to FIG. 2.

Optical network 100 may include one or more optical fibers 28 operable to transport one or more optical signals communicated by components of the optical network 100. The components of optical network 100, coupled together by optical fiber 28, may include nodes 112a and 112b. Node 112a may be similar to node 12a of FIG. 1, except that node 112a may further include a filter controller 42. Filter controller 42 may be any device configured to receive an optical signal from tunable transmitter 32 of node 112a, and based on the received optical signal, communicate control signals to tunable filter 34. In turn, tunable filter 34 may be configured to remove or filter out one or more channels the multi-channel signal received by tunable filter 34 from amplifier 26 based on the control signals communicated from filter controller 42, such that the filtered-out channels are of the wavelengths of the signal generated by tunable transmitter 32.

Node 112b may be similar to node 12b, except that node 112 may include a filter controller 62. Tunable filter 64 may be similar to tunable filter 34 of node 12b of FIG. 1. TDCM 60 may be similar to TDCM 30 of FIG. 1. Dispersion monitor 66 may be similar to dispersion monitor 36 of FIG. 1. OCM 68 may be similar to OCM 38 of FIG. 1.

Filter controller 62 may be any device configured to receive an optical signal from tunable transmitter 32 of node 112a, and based on the received optical signal, communicate control signals to tunable filter 64. In some embodiments, filter controller 62 may be a tracking filter, wherein filter controller 62 may communicate control signals to tunable filter 64 such that tunable filter 64 is able to track the wavelength of the channel communicated by tunable transmitter 32. In the same or alternative embodiments, filter controller 62 may communicate control signals to tunable filter 64 based on the signal originating from tunable transmitter 32. For example, tunable transmitter 32 may communicate an unmodulated signal or a modulated signal modulated than the multi-channel signal of node 112a and transmitted via fiber 28. Thus, filter controller 62 may be able to determine the signal originating from tunable transmitter 32 based on the modulation (or lack of modulation) of such signal, and accordingly communicate control signals to tunable filter 64.

Tunable filter 64 may include any filter or other suitable device configured to receive optical signals via fiber 28, pass a portion of one of the one or more channels of the multi-channel signal received via fiber 28. For example, tunable filter 64 of node 112b may receive the signal received via fiber 28 and pass the portion of the signal originating from tunable transmitter 32. Tunable filter 64 of node 112b may transmit the portion of the signal originating from tunable transmitter 32 to dispersion monitor 66 and OCM 68. In some embodiments, the channels passed from the multi-channel signal received may be of the same wavelength as the one or more channels communicated from tunable transmitter 32. In the same or alternative embodiments, tunable filter 64 of node 112b may be a Fabry-Perot filter.

Dispersion monitor 66 may analyze the portion of the signal originating from tunable transmitter 32 to measure the chromatic dispersion, polarization mode dispersion, and/or other dispersion experienced by the portion of the signal. Based on the measured dispersion, dispersion monitor 66 may communicate control signals to TDCM 60. Based on the control signals communicated to TDCM 60 from dispersion monitor 66, TDCM 60 may perform optical dispersion compensation on the signal communicated to amplifier 26 from tunable filter 34.

In addition, OCM 68 may analyze the portion of the signal originating from the transmitters 14 and 16 to determine the power, wavelength, OSNR, or other parameters associated with the signal.

As noted above, although optical networks 10 and 100 are shown as a point-to-point optical network with terminal nodes, one or more of optical networks 10 and 100 may also be configured as a ring optical network, a mesh optical network, or any other suitable optical network or combination of optical networks, and may include any suitable number of intermediate nodes interfaced between the terminal nodes.

It should be noted that although particular components have been shown, modifications, additions, or omissions may be made to the optical networks 10 and 100 without departing from the scope of the invention. The components of the optical networks 10 and 100 may be integrated or separated according to particular needs. Moreover, the operations of the optical networks 10 and 100 may be performed by more, fewer, or other components.

Although the present invention has been described with several embodiments, various changes and modifications may be suggested to one skilled in the art. It is intended that the present invention encompass such changes and modifications as fall within the scope of the appended claims.

What is claimed is:

1. A method for dispersion monitoring and compensation of an optical signal communicated in an optical network, the method comprising:

transmitting each of a plurality of carrier optical signals at a particular wavelength;

iteratively transmitting a plurality of test optical signals, each test optical signal at a selected wavelength of the particular wavelengths and modulated according to a modulation technique such that the modulation indicates that the test optical signal is a test optical signal;

for each test optical signal, combining the test optical signal with each of the carrier optical signals other than the carrier optical signal at the selected wavelength of the test optical signal into a multi-channel signal;

analyzing the multi-channel signal to determine if any of a plurality of channels of the multi-channel signal are modulated according to the modulation technique;

for each test optical signal, splitting the test optical signal from the multi-channel signal based on a determination that the test optical signal is on the channel modulated according to the modulation technique;

analyzing the test optical signal split from the multi-channel signal to measure optical dispersion in the test optical signal; and for each test optical signal, compensating for optical dispersion on a channel of the selected wavelength of the test optical signal based on the measured dispersion.

2. The method of claim 1, wherein analyzing the test optical signal split from the multi-channel signal to measure optical dispersion in the test optical signal comprises measuring at least one of chromatic dispersion and polarization mode dispersion in the test optical signal.

3. The method of claim 1, further comprising measuring at least one of channel power, channel wavelength, and optical signal-to-noise ratio (OSNR) for the test optical signal.

4. A system for dispersion monitoring and compensation of an optical signal communicated in an optical network, the system comprising:

a first optical node comprising:
   a plurality of transmitters, each of the plurality of transmitters configured to transmit a carrier optical signal at a particular wavelength;
   a tunable transmitter configured to iteratively transmit a plurality of test optical signals, each test optical signal at a selected wavelength of the particular wavelengths and modulated according to a modulation technique such that the modulation indicates that the test optical signal is a test optical signal; and
   a first tunable filter configured to, for each test optical signal, combine the test optical signal with each of the carrier optical signals other than the carrier optical signal at the selected wavelength of the test optical signal into a multi-channel signal; and a second optical node configured to receive the multi-channel signal and comprising:
   a second tunable filter configured to:
      analyze the multi-channel signal to determine if any of a plurality of channels of the multi-channel signal are modulated according to the modulation technique; and
      for each test optical signal, split the test optical signal from the multi-channel signal based on a determination that the test optical signal is on the channel modulated according to the modulation technique;
   a dispersion module configured to, for each test optical signal, analyze the test optical signal split from the multi-channel signal to measure optical dispersion in the test optical signal; and
   a tunable dispersion compensation module configured to, for each test optical signal:
      measure optical dispersion on the channel associated with the test optical signal; and
      compensate for optical dispersion on a channel of the selected wavelength of the test optical signal based on the measured dispersion.

5. The system of claim 4, the tunable dispersion compensation module further configured to analyze the test optical signal to measure optical dispersion in the portion by measuring at least one of chromatic dispersion and polarization mode dispersion in the portion.

6. The system of claim 4, the second optical node further comprising an optical channel monitor configured to measure at least one of channel power, channel wavelength, and optical signal-to-noise ratio (OSNR) for the test optical signal.

7. A system for dispersion monitoring and compensation of an optical signal communicated in an optical network, the system comprising:

means for transmitting each of a plurality of carrier optical signals at a particular wavelength;

means for iteratively transmitting a plurality of test optical signals, each test optical signal at a selected wavelength of the particular wavelengths and modulated according to a modulation technique such that the modulation indicates that the test optical signal is a test optical signal;

means for combining, for each test optical signal, the test optical signal with each of the carrier optical signals other than the carrier optical signal at the selected wavelength of the test optical signal into a multi-channel signal;

means for analyzing the multi-channel signal to determine if any of a plurality of channels of the multi-channel signal are modulated according to the modulation technique;

means for splitting, for each test optical signal, the test optical signal from the multi-channel signal based on a determination that the test optical signal is on the channel modulated according to the modulation technique;

means for analyzing the test optical signal split from the multi-channel signal to measure optical dispersion in the test optical signal; and means for compensating, for each test optical signal, optical dispersion on a channel of the selected wavelength of the test optical signal based on the measured dispersion.

8. The system of claim 7, the for analyzing the test optical signal split from the multi-channel signal to measure optical dispersion in the test optical signal comprises measuring at least one of chromatic dispersion and polarization mode dispersion in the test optical signal.

* * * * *